United States Patent [19]

Jerez

[11] Patent Number: 5,651,418
[45] Date of Patent: Jul. 29, 1997

[54] CONVERTIBLE, USER-SUPPORTED, GARDEN CLEANING IMPLEMENT FOR CUTTING/MACERATING WEEDS AND LIKE

[76] Inventor: Orlando Jerez, 3333 Delaware Ave., Kenner, La. 70065

[21] Appl. No.: 423,546

[22] Filed: Apr. 17, 1995

[51] Int. Cl.⁶ ............................................. A01B 33/00
[52] U.S. Cl. ................................. 172/14; 172/15; 30/276
[58] Field of Search ................................. 172/45, 15, 14, 172/13; 56/12.1, 12.7; 30/276

[56] References Cited

U.S. PATENT DOCUMENTS

| | | | |
|---|---|---|---|
| 1,610,161 | 12/1926 | Russell . | |
| 2,968,903 | 1/1961 | Kesling . | |
| 3,129,771 | 4/1964 | Lidstone . | |
| 3,483,905 | 12/1969 | Lawrence | 144/251 |
| 3,807,151 | 4/1974 | Rosenthal et al. . | |
| 4,049,059 | 9/1977 | Weibling | 172/15 |
| 4,189,901 | 2/1980 | Poettgen | 56/10.4 |
| 4,293,041 | 10/1981 | Holmstadt et al. . | |
| 4,295,324 | 10/1981 | Frantello et al. . | |
| 4,374,465 | 2/1983 | Comer . | |
| 4,382,356 | 5/1983 | Ballas et al. . | |
| 4,501,332 | 2/1985 | Straayer . | |
| 4,513,563 | 4/1985 | Roser et al. . | |
| 4,711,055 | 12/1987 | Mickos | 51/268 |
| 4,778,012 | 10/1988 | Kobashi et al. | 172/45 X |
| 4,805,704 | 2/1989 | Kobashi et al. | 172/45 X |
| 4,819,416 | 4/1989 | Jones . | |
| 4,834,462 | 5/1989 | Yamashita | 172/45 X |
| 4,856,194 | 8/1989 | Lee | 30/276 |
| 4,862,682 | 9/1989 | Wait et al. . | |
| 4,890,389 | 1/1990 | Whitkop | 30/276 |
| 4,894,980 | 1/1990 | Jones et al. | 56/320.1 |
| 4,909,024 | 3/1990 | Jones et al. | 56/16.7 |
| 4,936,884 | 6/1990 | Campbell . | |
| 4,962,630 | 10/1990 | Jones . | |
| 4,962,635 | 10/1990 | Jones et al. | 56/12.7 |
| 5,023,998 | 6/1991 | Masciarella et al. | 30/276 |
| 5,025,615 | 6/1991 | Hawkenson | 172/45 X |
| 5,027,591 | 7/1991 | Nakamura et al. | 30/276 X |
| 5,048,187 | 9/1991 | Ryan | 30/276 |
| 5,048,278 | 9/1991 | Jones et al. | 30/276 X |
| 5,060,383 | 10/1991 | Ratkiewich | 30/276 |
| 5,144,748 | 9/1992 | Hult | 30/276 |
| 5,271,212 | 12/1993 | Anderson . | |
| 5,406,708 | 4/1995 | Stephens et al. | 30/276 |
| 5,426,852 | 6/1995 | Macomber | 30/122 |
| 5,430,943 | 7/1995 | Lee | 30/276 X |

*Primary Examiner*—Terry Lee Melius
*Assistant Examiner*—Victor Batson
*Attorney, Agent, or Firm*—Pugh/Associates; C. Emmett Pugh

[57] ABSTRACT

A garden cleaning implement (10/10A) for weeds and the like comprising a cutting mechanism (14) and an adjustable guard mechanism (28) carried on, for example, an extended pole handle (22/122). The cutting mechanism includes an associated spool line shroud (16); an intermediate, rotatable shaft (18); and a rotatable, blade, cutting member (20/120/220). The guard mechanism includes a ring-shaped guard providing a protected area of a size sufficient to cover and protectively encircle over the rotating blade member; and slotted, attachment legs (32) for adjustably attaching the cutting mechanism and handle to the ring guard structure. The relatively rigid, cutting blade member is located under the adjustable, protective guard ring, allowing for protective cutting of, for example, weeds immediately adjacent to, for example, desirable vegetation. The implement is easily and quickly converted for cutting use, not only with a relatively rigid cutting blade member but also with supplemental, flexible cutting line(s), for trimming the undesirable vegetation, as well as easily and quickly converted between a straight, angled, handle version (FIGS. 5 & 6) to a bent handle version (FIGS. 5A & 6A, respectively) using the appropriately adaptable, mechanical connection or slotted legs between the cutting mechanism and the guard ring. The cutter blade member, ring guard structure and the mechanical interconnector (40) can be provided as a kit to convert a pre-existing "flexible cutting line mower" implement to a cutter/macerator-cultivator implement with supplemental line trimming.

13 Claims, 2 Drawing Sheets

CONVERTIBLE, USER-SUPPORTED, GARDEN CLEANING IMPLEMENT FOR CUTTING/MACERATING WEEDS AND LIKE

RELATED APPLICATION

This application relates to some of the same subject matter as the inventor's prior, pending U.S. patent application Ser. No. 08/288,959 filed Aug. 11, 1994, entitled "Garden Cleaning Implement for Cutting/Macerating Weeds Above & Below the Ground", the disclosure of which is incorporated herein by reference.

1. Technical Field

The present invention relates to a powered, user-held, garden cleaning implement which is used to remove weeds and the like out of, for example, a garden, and more particularly to such a garden cleaning implement which has a relatively rigid, rotating, cutting blade member located within an adjustable, protective guard ring, allowing for protective cutting of, for example, weeds and the like immediately adjacent to, for example, desirable vegetation without damaging the vegetation, while also allowing the cutter to be lowered down into the ground for cultivating the soil and macerating the weed roots. More particularly the present invention relates to such an implement which can be easily and quickly converted for use, not just with a relatively rigid cutting blade member but also with flexible cutting line(s), as well as easily and quickly converted between a straight, angled, handle version to a bent handle version using an appropriately adaptable, mechanical interconnection between the cutting mechanism and the guard ring. The present invention further relates to a "universal" kit for converting a standard type flexible cutting line, mower implement to the cutter/cultivator implement of the present invention, with optional, supplemental flexible trimming line added to the cutter/cultivator blade.

2. Background Art

In the on-going battle between the gardener and undesirable vegetation within a garden or lawn, there exists a multitude of devices and methods for extricating, chopping, removing and otherwise doing away with undesirable vegetation. These devices and methods include the use of: chemicals, such as herbicides; hand held implements, such as garden trowels; powered implements, such as string or monofilament line edgers and cutters, such as, for example, flexible cutting line, mower type devices; and, of course, the old standby method of "on-the-knees" weeding using the hands for implements. However, none of these devices and methods has allowed the gardener to quickly and easily win the war against undesirable vegetation within the lawn or garden arena.

Although generally safe for use in close proximity to surrounding desirable vegetation, some of these devices and methods, such as hand troweling and weeding by hand, are slow, tedious and laborious. Other devices and methods, such as string edgers and herbicides, although more rapid and less labor intensive than hand troweling and weeding by hand, pose a serious danger to surrounding desirable vegetation when used. It would be a benefit, therefore, to have a device that would rapidly remove and/or destroy undesirable vegetation without being labor intensive and which at the same time was safe for use around desirable vegetation within a lawn or garden setting.

There have been various attempts to provide devices and methods which achieve rapid and safe, rapid removal or destruction of undesirable vegetation in close proximity to desirable vegetation within a lawn or garden. A list of prior patents which may be of interest is provided below:

| Patent No. | Inventor | Issue Date |
|---|---|---|
| 1,610,161 | Russell | 12/07/26 |
| 2,968,903 | Kesling | 01/24/61 |
| 3,129,771 | Lidstone | 04/21/64 |
| 3,807,151 | Rosenthal et al | 04/30/74 |
| 4,293,041 | Holmstadt et al | 10/06/81 |
| 4,501,332 | Straayer | 02/26/85 |
| 4,862,682 | Wait | 09/05/89 |

U.S. Pat. No. 1,610,161, to Russell, issued on Dec. 7, 1926, discloses a rotary hoe or chopper having a cutting tilling member rotating in a plane substantially parallel to the ground surface.

U.S. Pat. No. 2,968,903, to Kesling, issued on Jan. 24, 1961, discloses a lawn edge trimmer having a guard and grass lifter unit. The guard and grass lifter unit includes a U-shaped bracket supporting a star shaped unit. The star shaped unit is positioned below a cutting blade. As the trimmer is moved along the edge of a walk, the star shaped unit engages and lifts the grass which is then cut by the cutting blade.

U.S. Pat. No. 3,129,771, to Lidstone, issued on Apr. 21, 1964, discloses a cultivating tool having a metal rod having one end portion sharpened to a point and having affixed adjacent to the end point a plurality of teeth or tines. As the metal rod rotates, the sharpened end portion penetrates into the soil while the teeth or tines cut and macerate the surrounding soil.

U.S. Pat. No. 3,807,151, to Rosenthal et al, issued on Apr. 30, 1974, discloses a trimmer-edger including a housing supported for movement on wheels. The housing encloses the motor and defines a cutting chamber in which a rotary blade is disposed. A guard plate which swings away about an axis parallel to the axis of rotation of the rotary blade is included to facilitate access to the blade for maintenance and for cleaning out the cutting chamber.

U.S. Pat. No. 4,293,041, to Holmstadt et al, issued on Oct. 6, 1981, discloses a hand-held power driven cultivator that includes a pair of ground working implements or tillers. The tillers are counter-rotated and include interdigitating tines which engage and move the earth forwardly.

U.S. Pat. No. 4,501,332, to Straayer, issued on Feb. 2, 1985, discloses a hand-carried, portable weeder/cultivator apparatus for weeding and cultivating small areas. The apparatus includes an inverted dish-shaped element rigidly attachable to a conventional string-type edger for converting conventional above ground string-type weeders into a below ground weeder/cultivator.

U.S. Pat. No. 4,862,682, to Wait, issued on Sep. 5, 1989, discloses a blade assembly including a U-shaped blade used for tilling the soil.

Additionally, a further list of prior patents, which may be of interest on the use of filament cutting lines attached to a centralized rotating member, is provided below:

| Patent No. | Inventor | Issue Date |
|---|---|---|
| 4,295,324 | Frantello et al | 10/21/81 |
| 4,374,465 | Comer | 02/22/83 |
| 4,382,356 | Ballas et al | 05/10/83 |
| 4,513,563 | Roser et al | 04/30/85 |

-continued

| Patent No. | Inventor | Issue Date |
| --- | --- | --- |
| 4,819,416 | Jones | 04/11/89 |
| 4,936,884 | Campbell | 06/26/90 |
| 4,962,630 | Jones | 10/16/90 |
| 5,271,212 | Anderson | 12/21/93 |

For example, it is noted that the patent to Comer (U.S. Pat. No. 4,347,465) discloses a wheel-supported, rotary lawn mower having a rigid cutting blade for mowing or cutting and also having a filament holder attachment 12 which allows flexible filament line 14 to be attached to (and removed from) the ends of the rigid blade for trimming when so desired. However, the attachment means is relatively involved, complex and expensive, requiring an extra, moving part, in comparison to the innovative approach used in the present invention, and would not be effective nor stand-up in extended use with the cultivating or macerating action of the implement of the present invention. Additionally, there is no suggestion of the innovative, dual handle convertability features of the invention. The actions and functions are significantly different in a lawn mower, such as Comer's, as compared to the cutter/macerator-cultivator of the invention. Additionally, the prior art does not suggest the "universal" conversion kit aspects of the invention.

A review of all of the foregoing listed, prior patents show that they do not suggest nor teach, singularly or in any appropriate combination, the innovative, utilitarian, valuable advances of the present invention.

GENERAL SUMMARY OF THE INVENTION

It is thus an object of the invention to provide a user held and supported, garden cleaning implement which may be effectively used to destroy and/or remove undesirable vegetation in, for example, close proximity to desirable vegetation without damaging the latter.

It is a further object of the invention to provide a garden cleaning implement which may be used to destroy and/or remove undesirable vegetation by cutting the undesirable vegetation using a relatively rigid rotating blade member, but also allowing the easy addition, when desired, of cutting line(s) to the blade member for supplemental, trimming action in a very simple, straight forward way with minimal, added manufacturing expense.

It is a still further object of the invention to provide a garden cleaning implement which may be used to destroy and/or remove undesirable vegetation which has a rotating cutting member enclosed or at least encircled over in a vertically and angularly adjustable or moveable protective ring which is quick and easy to configure and adjust, and is also of very limited height and has an open top, allowing ease of the rotating blade to move down into the ground for a cultivating/macerating action, without clogging the cutter mechanism.

Another object of the present invention is to further provide an easily adaptable interface between the implement's handle and the encircling, protective guard to allow different styles and configurations of handles to be used and quickly interchanged.

It is thus a very basic object of the invention to provide a gardening implement that does the job in a reliable, cost effective manner, with great flexibility or adaptability, allowing easy back-and-forth conversion from a simple rotating blade cutter to one with a supplemental line trimmer sub-system, as well as easy and quick adaptation from one type of handle sub-system to another.

It is a further basic object to provide a "universal" conversion kit for quickly and easily converting various types and differently configured flexible line, mower implements to a cutter/macerator-cultivator type system, while allowing flexible trimming lines to be added to and removed from the cutter blade when desired.

It is also a very basic object of the invention to provide a protective encircling ring for the rotating blade member which allows the blade member to easily cut down into the ground when a cultivating, macerating action is desired without getting the cutting mechanism clogged.

Accordingly, a garden cleaning implement is provided that comprises a cutting mechanism and an adjustable guard mechanism. The cutting mechanism includes—an associated powered source of rotational power; an intermediate, rotatable shaft, in rotational force receiving connection with the source of the rotational power; and at least one rotatable cutting member, in functionally rigid attachment to the rotatable shaft, having at least one functional cutting point or edge blade member which is relatively rigid and rotatable within a plane. Additionally, the cutting system also includes the optional addition to the blade member of one or more flexible line(s) for supplemental trimming action with a swath of greater diameter than that of the blade member itself.

As used herein the term "rotational force receiving connection" means any mechanical connection that will allow the source of rotational power to supply a rotational force to the rotatable shaft including direct connections and connections through gearing mechanisms and flexible shafts, etc. The term "functionally rigid attachment" means any attachment that will allow the rotatable shaft to impart rotational energy to the cutting member including rigid and clutch type connections, as well as flexible connectors which are not constrained to follow a straight line, etc. The term "functional point" means a point located on a portion of the cutting member that will contact and severe vegetable material when the cutting member is rotating. In addition, it should be noted that the rotatable cutting member need not be planar itself and may be of any appropriate shape or configuration. Also, the cutting member may rotate about any point including its center or end, although the rectangular, two edge blade with a center axis disclosed below is currently preferred.

The guard mechanism includes—an encircling, vertically adjustable housing or rim having a protective size sufficient to cover over and protectively encircle the rotating cutting member, which rim or ring is of a short height and open top, allowing easy exit and removal of dirt and cuttings; and attachment sides or legs in operational connection between the retractable encircling ring and the cutting mechanism, for allowing the vertical position of the guard to adjusted with respect to the cutting blade member. These attachment legs preferably also have an angularly adjustable interconnection between the side legs and the implement's handle (with its attached, powered blade member), allowing the angle of the incoming end of the handle to be at many, different, selected angles with respect to the protective ring guard. This latter approach allows differently configured handles to be used as part of the implement, allowing, for example, the alternative use of a straight, angled handle or a bent handle having a lower, vertically directed section and a longer, somewhat horizontally directed section proximal to the user.

As used herein the term "operational connection" means any mechanical connection that allows the vertical adjustment of the protective, encircling guard with respect to the plane of the rotating cutting blade member and/or the attachment of the handle/cutting-mechanism at various selected, desired angles.

An example of such "operational connection" means are a pair of side extensions or legs extending up from the sides of the encircling guard with a pair of parallel slots extending up along the length of the sides, along with a handle interconnection member with sets of at least two bolt slots or arcuate apertures therein, allowing the handle to be attached to the side extensions at at least two, substantially different angles [e.g. forty-five (45°) degrees or zero (0°) degree, i.e., diagonally or vertically, respectively] by appropriately setting the relative positions of the bolt apertures with the leg slots and bolting them together.

The rotatable blade member can have many different configurations, and three exemplary ones are illustrated herein. However, each preferably includes a substantially flat, radial section and an upwardly extending, central section. The line segment preferably includes a larger diameter, proximal end piece, formed by, for example, knotting the proximal end or adding a lug on its proximal end, with the remaining length extended through an opening in the side wall of the central section and then laying on the flat, radial section, which preferably includes a holding or anchoring bridge through which the line passes. Such an arrangement provides a quick, easy and inexpensive means of attaching and positioning (as well as thereafter removing) the line(s) on the rotatable blade member for providing the supplemental flexible line trimming action.

Additionally, the present invention provides a "universal" conversion kit for converting a standard flexible line type implement to a cutter/macerator-cultivator type of implement by providing a "universal" adapter/interconnector for connecting the cutter/macerator-cultivator blade member and protective ring to the operative end of the handle of a pre-existing line trimming implement, typically after the line spool has been removed from the pre-existing line trimming implement. The "universal" adapter may be used with many different designs of line trimming implements and provides within the same structure the ability to attach to handles that, at their distal, operative ends, have differently configured and angled, end handle sections. Additionally, the interconnector adapter allows angular adjustment between the cutter blade member and the operative end of the line trimming implement, as well as vertical or clearance adjustment between the cutter blade member and the protective ring. With respect to the use of the word "garden", it should be understood that does not restrict the invention to home or residential type applications, although that is a particularly efficacious application, but also includes industrial, agricultural, horticultural or farming, as well as commercial uses.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 3 is a perspective, top view of an alternative, relatively rigid blade member which can be used in place of the one illustrated in FIGS. 1 & 2; while

FIG. 5 is a perspective view showing the preferred, exemplary embodiment of FIG. 1 in use in cutting weeds, grass and like vegetation in close proximity to a plant or tree seedling, with the protective ring guard protecting the latter form damage; while

FIG. 6 is a perspective view showing the preferred, exemplary embodiment of FIG. 2 (with the flexible line included) in use in cutting weeds, grass and like vegetation, with the supplemental protective guard member protecting the user; while

EXEMPLARY MODES FOR CARRYING OUT THE INVENTION

Figure 1:
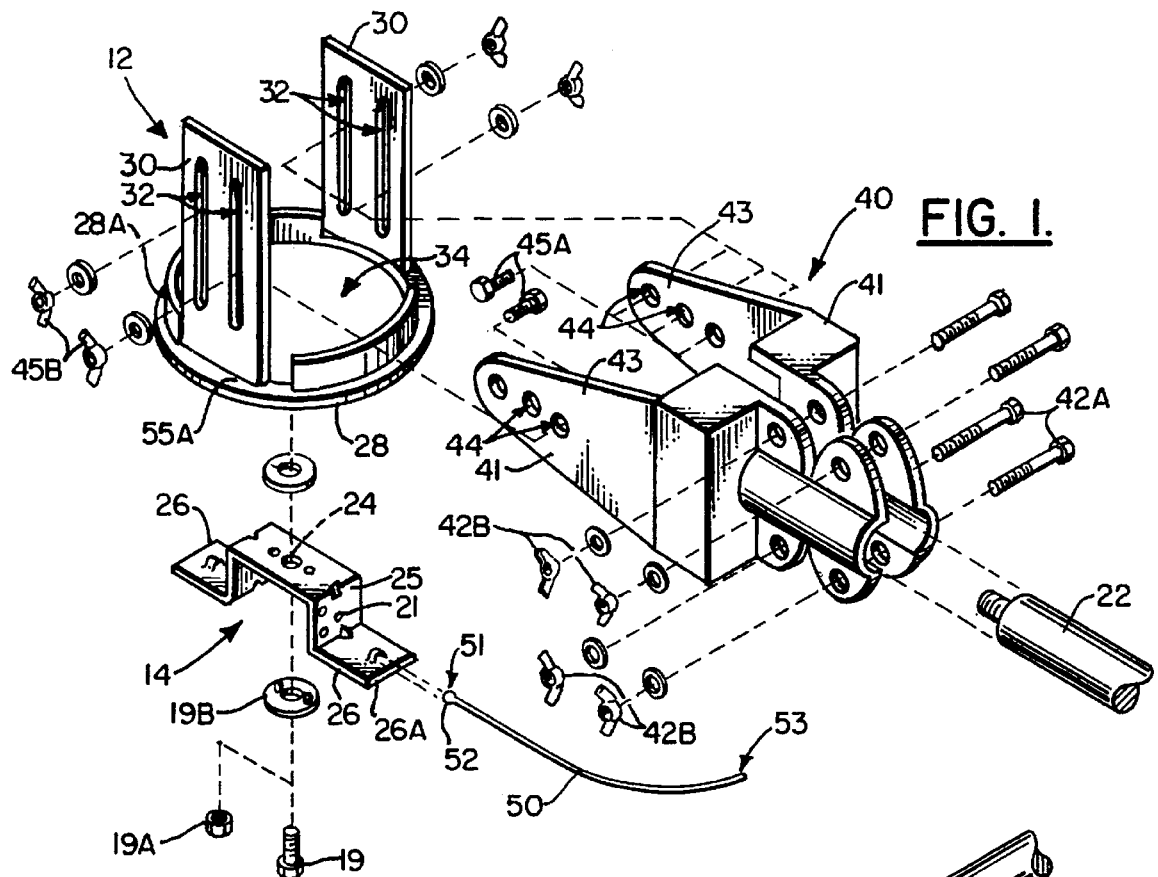
FIG. 1 is a perspective, exploded view of a preferred, exemplary embodiment of the convertible garden cleaning implement of the present invention showing its various parts in exploded array (with an exemplary, pre-existing flexible line spool shroud not being shown in this figure for simplicity purposes), including an optional flexible line for adding line type trimming to the relatively rigid blade member.
Figure 2:
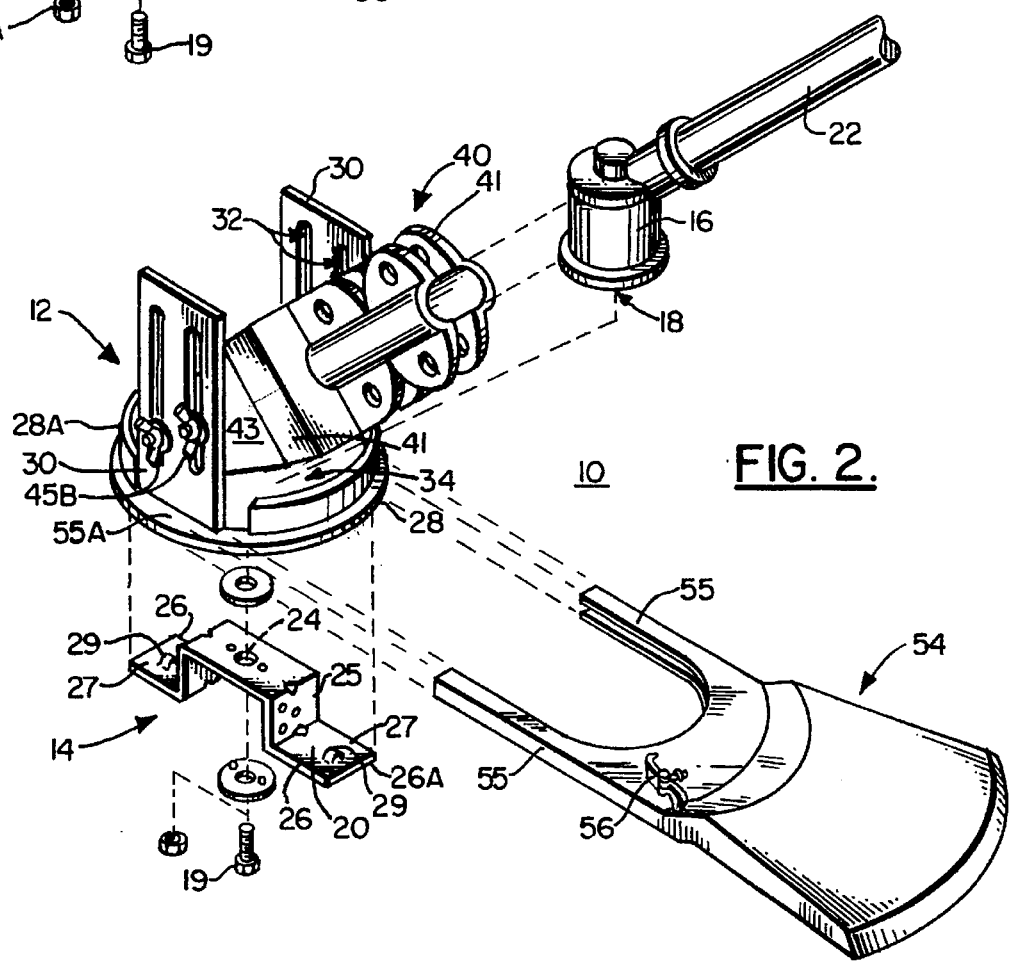
FIG. 2 is a perspective, partially exploded view of the preferred, exemplary embodiment of FIG. 1 but with an exemplary, pre-existing flexible line spool shroud in place and with the addition of a supplemental guard for use in protecting the user from contact with the optional flexible line (the latter not being illustrated in this figure for simplicity purposes).

As can be seen in the exploded, perspective views of FIGS. 1 & 2, a first, preferred, motorized embodiment of the convertible and converted garden cleaning implement 10 of the present invention comprises an open top, guard ring mechanism having a low height, generally indicated by the numeral 12, and a rotatable, at least relatively rigid cutting mechanism, generally indicated by the numeral 14. In the "universal" adapter aspects of the invention, the cutting mechanism 14 typically includes a line spool shroud or cover 16 (note FIG. 2) of the pre-existing line trimming implement, which has a powered, rotatable shaft 18 (generally un-seeable in figure), a relatively rigid, cutting blade member 20 attached to the rotatable shaft 18, and an angled handle member 22 in rigid connection with the spool shroud 16.

In this preferred embodiment, the relatively rigid, cutting blade member 20 has the general, preferred shape of an elongated rectangle (from the perspective of a plan view) with a central, circular "hump" or upwardly extending, central section 25 (from the perspective of a side view) having its axis of rotation at its center 24 and with cutting, leading edges along its side edges 26. An outer, substantially flat, radial section 27 surrounds the centrally raised section 25.

The cutting/cultivating member 20 has a relatively small horizontal length or effective diameter, which is much smaller in length or effective diameter than the blade of a rotary lawn mower, as well as a different function (maceration/cultivation vs. grass cutting). It is preferred that the cutting member 20 have a length (i.e., the diameter of its cutting swath) of about five inches (5"), for example, five and five-eights (5⅝") inches, where the encircling ring has an inner diameter of about four and seven-eights (4⅞") inches and an outer diameter of about five and seven-eights (5⅞") inches. Thus, it should be understood that, with such dimensions, the outer, distal tips 26A of the blade member 20 travel under the bottom surface of the rim of the encircling member 28, between its inner and outer diameters.

Of course, these exemplary dimensions are subjected to great variation, including providing larger diameter sizes for, for example, larger, pre-existing line trimming type implements. The presence of the wing nut connectors 45A/45B and the elongated slots 32 allows the vertical clearance and location of the blade member 20 to be adjusted with respect to the bottom surface of the rim of the ring 28.

The cutting member 20 is attached to the rotatable shaft 18 by a bolt 19, or, alternatively, a nut 19A, depending on what type of mating fitting is provided on the bottom of the drive shaft 18 of the handle 22, and using an appropriate lock washer 19B. The lock washer 19C includes a pair of upper, pin extensions which mate into similarly spaced holes in the blade member 20, and one or more supplemental washer(s) may also be used. However any device or method which forms an appropriate, functionally rigid attachment between the cutting member 20 and the rotatable power shaft 18 may be used. As would be understood by one of ordinary skill, when the cutting distal tips 26A are rotated they define a cutting plane.

In the preferred embodiments, the implement 10/10A is powered or motorized. Any appropriate motor (electric, gasoline, etc.) properly sized and capable of supplying rotational power to the rotatable shaft 18 may be used to practice the invention, and can include appropriate gearing mechanisms or other coupling devices. The embodiments illustrated are primarily designed for pre-existing, gasoline powered implements.

The guard mechanism 12 includes a blade tip covering, protective ring 28, having affixedly attached thereto two, upwardly extending, side legs or extensions 30 having two, parallel, upwardly extending or elongated, attachment slots therein 32. The encircling guard 28, which, as can be seen in the figures, is completely closed and circular, forms an enclosed area 34 with an open top, whose bottom, circular surface is of a size sufficient to cover over and thereby protectively encircle the distal tips 26A of the cutting member 20.

It should be noted that the ring or rim 28 has an open top with a wall 28A of relatively short height, for example, about five and a quarter (5¼") inches in height, which allows the lower, rotating blade sections 26 to easily move down into the ground for a cultivating/macerating action, without the cutter mechanism getting clogged and further allowing easy exit, or removal of, dirt and cuttings. With the open top and the limited height of the ring 28, the dirt and other debris easily moves up and out and over the wall 28A of the ring 28.

A supplemental interconnection mechanism 40, having two, separable, mated sections 41 (note particularly FIG. 1), interfaces with the side leg extensions 30 to connect the encircling guard 28 to the handle 22 at an appropriate angle. The two, mated sections 41 are attached together by a series of laterally directed bolt and wing nut sets 42A/42B using appropriate washers.

The mated sections 41 include two, lower extensions 43 having an exemplary three, arcuate apertures or slots 44. With the use of the bolt and wing nut sets 45A/45B and appropriate washers, and the selectively positioning of the bolts through the desired, respective parts of the arcuate apertures 44 and the pair of leg slots 32, the interconnection with the inserted handle 22 are attached to the protective guard structure 12 at the desired angle, for example, forty-five (45°) degrees or zero (0°) degree, i.e., diagonally or vertically, respectively (compare, for example, the relative dispositions of the handles 22 & 122 shown in FIG. 5 & FIG. 5A and FIG. 6 & FIG. 6A, respectively), as well as many other angles, i.e. from about zero (0°) degrees, starting at the vertical, continuously down to about eighty-three (83°) degrees, that is, near horizontal, in the exemplary embodiments illustrated. Likewise, it allows, as noted above, the setting of the desired vertical clearance and location of the bottom blade sections 26 of the blade member 20 to be adjusted up-and-down with respect to the bottom surface of the rim of the ring 28. As would also be understood by one of ordinary skill, this allows the guard mechanism 12 to be vertically adjustable along an axis of rotation substantially perpendicular to the cutting plane, i.e., to be vertically adjustable along the axis of rotation of the rotatable power shaft 18, which itself is substantially perpendicular to the cutting plane.

When it is desired to add a supplemental flexible line trimming action to the cutter blade mechanism 14 (note FIGS. 6 & 6A), one or more, flexible, radially extended, trimming lines or filaments 50 are added to the cutting blade member 20 (e.g. one, as illustrated in FIG. 1, or, alternatively, two, i.e. one for each blade section 27), with the lines extending substantially past the periphery of the ring guard 28 but not past the supplemental line guard 54. Each of the lines 50 is knotted at its proximal end 51 or otherwise has a lug or other appropriate diameter extender 52 added.

This results in the trim line 50 having a larger effective diameter at its proximal end 51 than elsewhere along its length. The distal end 53 of the line 50 initially is inserted through an appropriately sized opening 21 from the inside out and then under and through a anchoring or bridge hold-down 29, which serves as a line connector, on the outer, flat, radially extended, blade section 27, with its distal end 53 extending substantially past the distal edge of the blade section. It should be noted that the line aperture 21, the radially spaced, line connector 29, and the distal tip 26A (particularly 126A/226A) are in radial alignment.

The diameter extender 52 prevents the proximal end 51 of each line 50 from moving past or through the central section opening 21, while allowing the added line 50 to be easily removed by grasping the diameter extender 52 and pulling it right out through the interior of the central section 25. With the two point securement spaced along the length of the line 50 provided by the central opening 21 and the radially-in-line, bridge hold-down 29, the line 50 is securely and appropriately located and held in place on the blade member 20.

In use, the line(s) 50 and in particular their diameter extended ends 52 are held to the wall of the centrally located section 25 of the cutting blade member 20 by centripetal force, preventing it/them from coming off; while allowing their easy removal, when so desired, by merely pulling on the diameter extended ends 52 from the interior side of the centrally located section 25 when the implement 10/10A and the blade member 20 are at rest.

Figure 6:
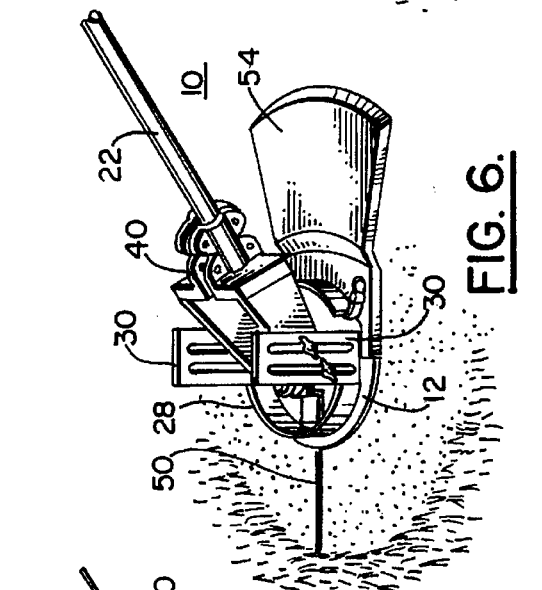
Figure 6A:
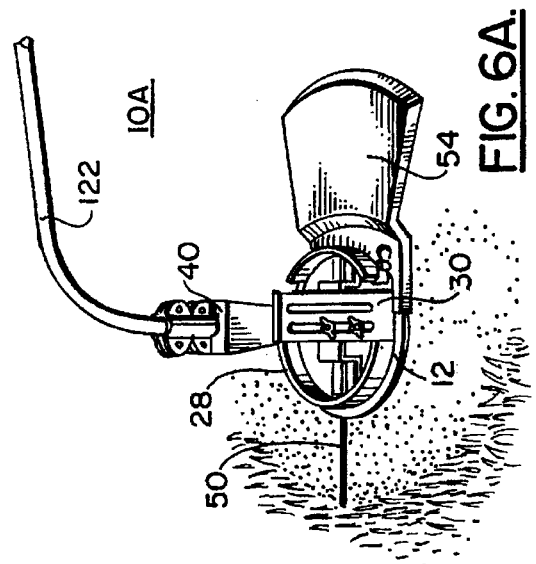
FIG. 6A is a perspective view similar to that of FIG. 6, but with a bent handle being used in place of the straight handle of that figure and with the adjustable connection of the handle to the ring guard being appropriately adjusted.

For protection of the user from the rotating trimming line(s) 50, a supplemental, easily added and removed, radially and rearwardly extended guard 54 is provided (note FIG. 2 & FIGS. 6 & 6A). Side, straddling legs 55 are included, which are slid over side, lateral extensions 55A on the structure of the encircling guard 28. A clamp 56 is provided to secure the supplemental line guard to the encircling guard 28.

Figure 3:
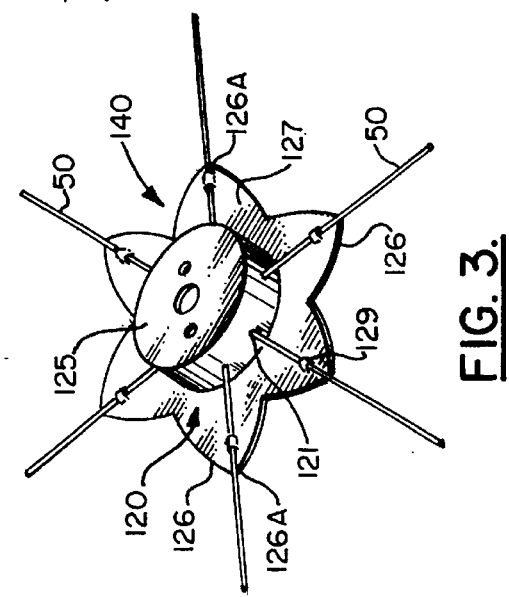
Figure 4:
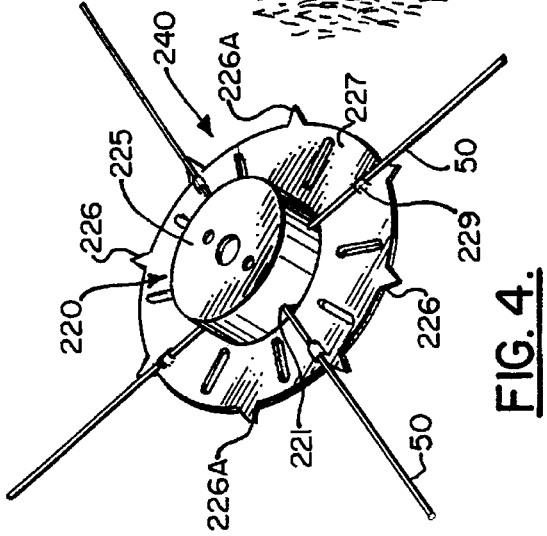
FIG. 4 is a perspective, top view of a another, alternative, relatively rigid blade member which can be used in place of the one illustrated in FIGS. 1 & 2.

The relatively rigid blade member can take many different forms, and two, alternative embodiments are illustrated in FIGS. 3 & 4.

Star-shaped, blade member 120, like the blade member 20, includes an outer, substantially flat, horizontally extended, radial section 127 surrounding the cylindrical, centrally hump section 125. Up to six, radially extended, trimming lines 50 can be added and removed using the peripherally and equally spaced, central openings 121 and the bridge hold-downs 129 when desired, in the same fashion as the lines 50 were added to and removed from the cutting blade member 20. Similarly to the blade member 20, the blade member 120 includes cutting edges 126 and a peripherally-spaced series of distal, end tips 126A.

Likewise, the circularly-shaped, blade member 220, like the blade members 20/120, includes an outer, substantially flat, horizontally extended, radial section 227 surrounding the cylindrical, centrally hump section 225, and up to four, radially extended, trimming lines 50 likewise can be added or removed when desired, using the peripherally and equally spaced, central openings 221 and the bridge hold-downs 229, in the same fashion as before. Likewise, similarly to the blade members 20/120, the blade member 220 includes cutting edges 226 and a peripherally-spaced series of distal, end tips 226A.

The embodiments of FIGS. 3 & 4, with their extended bottom surfaces extending continuously, completely around the periphery of their respective surfaces 127/227, provide a more stable macerating and cultivating or tilling surface as the implement 10/10A is lowered down with its rotating blade member 120/220 in ground contact. The cutter embodiments 120/220 of FIGS. 3 & 4, with their substantially flat, extended surfaces are preferred for their smoother, extended surface, cultivating action in their direct contact with the ground in the cultivator/macerator mode of use.

In use, the encircling guard 28 with the cutting member 20 rotating is placed down over the undesired, weedy vegetation to be destroyed and/or removed. The cutting member 20 typically is then moved from side-to-side as the user supports and hand-holds the implement, either independently or with the use of a body strap, and walks around, cutting the undesired vegetation, such as weeds, over-grown grass and the like, or other undesired weedy vegetation, while the encircling guard isolates and protects any surrounding vegetation or adjacent structures from being cut or struck, while at least in part also protecting the user from flying debris.

Figure 5:
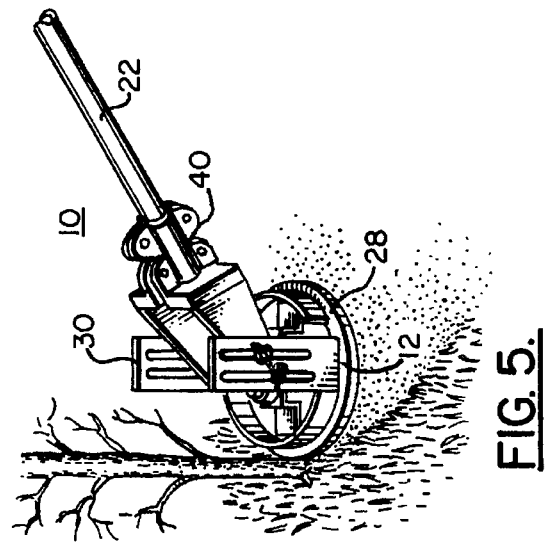
Figure 5A:
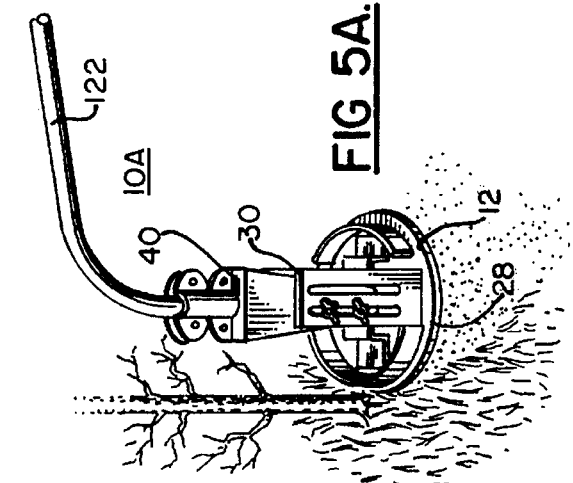
FIG. 5A is a perspective view similar to that of FIG. 5, but with a bent handle being used in place of the straight handle of that figure and with the adjustable connection of the handle to the ring guard being appropriately adjusted.

FIGS. 5 and 5A are perspective views of the preferred, exemplary embodiments of the garden cleaning implement 10/10A being shown in use to cut, macerate and cultivate, with the two different, exemplary handles, namely, the straight, angled handle 22 and the bent handle 122 having a vertical section, respectively. Likewise, FIGS. 6 and 6A are perspective views of the preferred, exemplary embodiments of the garden cleaning implement 10/10A being shown in use to cut and trim, with the two different, exemplary handles, namely, the straight, angled handle 22 and the bent handle 122, respectively, with the embodiments of FIGS. 6 & 6A including the optional trimming lines 50 and supplemental line guard 54.

When the "universal" adapter aspects of the invention are used, the user will typically have a pre-existing line trimming implement, typically including an extended, some-times bent, handle (22/122), a power source (not illustrated and well known), a power shaft (18), a protective guard, and an operative, line, trimming head connected to the power shaft. The line cutting head typically includes a line spool at its bottom, and possibly also a protective shroud (16), while others do not include such a shroud.

Before using the ring guard section 12 and the "universal" mechanical interconnector 40, the line spool and preferably any guard or shield is removed from the pre-existing, line trimming implement, typically by unscrewing various mechanical fittings and sliding these parts off. If there is a shroud (16) and if it is easily removable, it preferably also is removed; otherwise it is left on.

Then the blade member 20 (120/220) and the ring guard section 12 and the "universal" mechanical interconnector 40 are attached to the lower end of the pre-existing the power shaft 18 and handle 22/122, respectively, while using the relative positioning of the elongated slots 32 and arcuate apertures 44 to adjust the interconnection parts of the adapter to appropriately mate, align and position the various parts together, to ultimately produce, with the ancillary hardware fittings, the combined, converted, cutter/macerator-cultivator implement illustrated in the figures.

It should be understood that the foregoing variations and alternatives are merely exemplary and many other changes are possible within the teachings of the present invention.

Thus, it can be seen from the preceding description that garden cleaning implements which may be used to destroy and/or remove undesirable vegetation in close proximity to desirable vegetation by chopping or cutting the undesirable vegetation, both above and below the soil surface, and which has a rotating cutting/tilling member disposable within a vertically retractable housing, have been provided and fully described above in various exemplary embodiments.

However, it is noted that the embodiments of the garden cleaning implements described herein in detail for exemplary purposes are of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein generally are to be interpreted as illustrative and not in a limiting sense.

I claim:

1. A garden cleaning implement for cutting and macerating weeds, both above and below the ground line, comprising:

a hand carryable cutting mechanism, including
  a) a rotatable shaft operationally connectable to an associated source of rotational power; and
  b) a rotatable cutting and cultivating member with distal tips and cutting edges, said cutting member being in functionally rigid attachment with said rotatable shaft, said rotatable cutting member having at least one functional cutting point rotatable within a cutting plane capable of cutting weeds above the ground and macerating their roots within the ground;

a handle connected to said cutting mechanism and used by the user to carry and manipulate the implement to cut and macerate undesirable vegetation; and an associated guard mechanism, including
  c) a moveable, open top, completely closed and circular ring guard, vertically adjustable along an axis of rotation substantially perpendicular to said cutting plane, and with a side wall and an open top and of a size sufficient to cover the distal tips of said rotatable cutting member when said rotatable cutting member is rotated; and d) a mechanical interconnector connecting said ring guard to said handle, allowing the ring guard to be adjusted with respect to its vertical position relative to said cutting member.

2. The garden cleaning implement of claim 1, wherein:

said ring guard has an inner and an outer diameter; and said cutting member has a maximum, horizontal length which is between said inner and outer diameters, and said cutting edges are located below but adjacent to the bottom of said guard ring.

3. The garden cleaning implement of claim 2, wherein:

said ring guard and said interconnector include between them at least a pair of parallel, elongated slots and a set of at least two arcuate slots, with at least two threaded bolts and two like threaded nuts, the relative placement of the bolts through selected portions of the two sets of slots and the relative placement of the arcuate slots with respect to said parallel slots determining the relative vertical positioning of said cutting member with respect to said ring guard and the angular relationship between said handle and said cutting member.

4. The garden cleaning implement of claim 1, wherein:

said cutting member includes an interior and a centrally located, raised section and a lower, radially extended, outer section, said centrally located section having at least one trim line aperture therein and said radial section having a line connector spaced located radially out from said trim line aperture; and wherein there is further included:

at least one trim line having a larger effective diameter at its proximal end than elsewhere along its length, said larger effective diameter being located within the interior adjacent to said line aperture, with the remaining part of the line extending out past said line aperture to and past said line connector and further past the distal tips of said cutter member, providing a supplemental trimming function to said cutting member, said line and said line connector being engaged, fixing the location of that part of the line to that part of said radial section.

5. The garden cleaning implement of claim 4, wherein:

said cutting member has basically a rectangular configuration in a plan view.

6. The garden cleaning implement of claim 4, wherein:

said centrally located section is cylindrical in configuration, and said radially extended section is continuous and circular in configuration with a peripherally-spaced, series of distal tips, said line aperture, said line connector and one of said distal tips being in radial alignment.

7. The garden cleaning implement of claim 6, wherein there are included:

at least four of said trim lines, four of said line apertures, four of said line connectors and four of said distal tips, one for each line in radial alignment, with said lines being radially arrayed.

8. The garden cleaning implement of claim 4, wherein there is further included:

a supplemental, line trim guard attached to said ring guard and extending rearwardly past the distal end of said trim line.

9. A method of cutting and macerating weeds, both above and below the ground line, comprising the following steps:

a) providing a hand carryable cutting mechanism, including i) a rotatable shaft operationally connectable to an associated source of rotational power; and ii) a rotatable cutting and cultivating member with distal tips and cutting edges, said cutting member being in functionally rigid attachment with said rotatable shaft, said rotatable cutting member having at least one functional cutting point rotatable within a cutting plane capable of cutting weeds above the ground and macerating their roots within the ground; and an associated guard mechanism, including iii) a moveable, open top, completely closed and circular ring guard, vertically adjustable along an axis of rotation substantially perpendicular to said cutting plane, and with a side wall having an open top and of a size sufficient to cover the distal tips of said rotatable cutting member when said rotatable cutting member is rotating; and iv) a mechanical interconnector connecting said ring guard to said handle, allowing the ring guard to be adjusted with respect to its vertical position relative to said cutting member;

b) manually moving said cutting mechanism around above the ground in a side ways fashion, while said cutting member is being rotated, cutting the weeds above the ground as the weeds are contacted by said cutting member, while using the guard ring to protect any surrounding vegetation outside of the ring guard; and c) manually pushing said cutting member, while it is being rotated, down into the ground macerating the roots of the weeds and tilling the surrounding ground, with the ground and cuttings moving up the side wall of said ring guard and out its open top, over said side wall.

10. The method of claim 9, wherein said cutting member further includes an interior and a centrally located, raised section and a lower, radially extended, outer section, said centrally located section having at least one trim line aperture therein and said radial section having a line connector spaced radially out from said trim line aperture; and wherein there is further included at least one trim line having a larger effective diameter at its proximal end than elsewhere along its length; and wherein there is further included the following steps:

inserting the distal end and the body of the trim line through said line aperture from the interior side thereof, until said larger effective diameter is located within the interior adjacent to said line aperture, with the remaining part of the line extending out past said line aperture to and past said line connector, connecting that part of the line adjacent to said line connector to said line connector, pulling the remaining line past said line connector, and rotating said trim line by rotating said cutting member, producing a supplemental trimming function to said cutting member.

11. A method of converting a user supported, flexible line, mower type implement, having a handle with a distal end, a power shaft located adjacent to the end of the handle, a power source for driving the rotating shaft, a trim line spool attached to the end of the rotating shaft to supply trim line for trimming vegetation, to a user supported, garden implement usable to cut and macerate weeds and the like, both above and below the ground line within a cutting plane, comprising the following steps:

a) removing said trim line spool from said power shaft;

b) attaching a cutting blade member having distal tips to said power shaft in place of said trim spool;

c) attaching a guard mechanism, including a completely closed and circular ring guard which is vertically adjustable along an axis of rotation substantially perpendicular to said cutting plane, and including a mechanical interconnector, to the distal end of said handle, with said ring guard protectively encircling the distal tips of said cutting blade member; and d) adjusting and setting the relative vertical position of said cutting blade member with respect to said ring guard and the angle of said handle with respect to said ring guard using said mechanical interconnector, until they are all appropriately positioned to allow the implement's use to cut and macerate weeds and the like, and cultivate the ground surface using said blade member.

12. The method of claim 11, wherein said cutting blade member further includes an interior and a centrally located, raised section and a lower, radially extended, outer section, said centrally located section having at least one trim line aperture therein and said radial section having a line connector spaced radially out from said trim line aperture; and wherein there is further included at least one trim line having a larger effective diameter at its proximal end than elsewhere along its length; and wherein there is further included the following steps:

inserting the distal end and the body of the trim line through said line aperture from the interior side thereof, until said larger effective diameter is located within the interior adjacent to said line aperture, with the remaining part of the line extending out past said line aperture to and past said line connector, connecting that part of the line adjacent to said line connector to said line connector, pulling the remaining line past said line connector, and rotating said trim line by rotating said cutting blade member, producing a supplemental trimming function to the cutting function of said cutting member.

13. The method of claim 12, wherein there is included the further step of:

attaching a supplemental, line trim guard to said ring guard extending rearwardly past the distal end of said trim line.

* * * * *